3,418,280
STABILIZATION OF OXYMETHYLENE COPOLY-
MERS BY ALKALINE HYDROLYSIS
Donald E. Orgen, Old Bridge, N.J., assignor to Celanese
Corporation, a corporation of Delaware
No Drawing. Filed Dec. 31, 1964, Ser. No. 422,573
2 Claims. (Cl. 260—67)

ABSTRACT OF THE DISCLOSURE

A process for the stabilization of a normally solid oxymethylene copolymer whose molecules contain a majority of relatively unstable monomeric oxymethylene units interspersed with comparatively stable, monomeric higher oxyalkylene units, e.g., —O—$CH_2$—$CH_2$— units, at least part of the terminal portions of said molecules comprising said unstable monomeric units, which involves hydrolyzing said copolymer at elevated temperature and pressure in the presence of water, or an organic hydroxy-containing alcohol, or mixtures thereof, at a pH between 9.5 and 11.0, operation within said pH range serving to impart optimum color properties to said copolymer.

---

This invention relates to stabilized polymers and, more particularly, to polymers which are comparatively stable against degradation but which are derived from polymers which have a higher susceptibility to such degradation. The invention also relates to method of stabilizing such polymers.

Certain polymers are comprised of comparatively stable and comparatively unstable monomeric units and many times the resistance of such polymers to degradation depends upon the relative location of the aforementioned stable and unstable monomeric units. For example, if a polymer is susceptible to degradation by a mechanism which attacks the ends of the polymer molecules it can be seen that if the ends of the molecules are susceptible to degradation, the polymer will have less stability than if the molecule ends are relatively stable to degradation.

While the subject invention will be described with reference to thermally stabilized oxymethylene polymers it should not be limited thereto as the principles of the invention are applicable to other polymers having appropriate stable and unstable units.

In general, the invention involves the stabilization of a polymer having stable and unstable units in its molecules by treating the polymer in such a way as to selectively degrade the polymer and remove unstable units from its molecules.

In a preferred embodiment of this invention there is provided a method of stabilizing a heterogeneous polymer against thermal degradation wherein the unstabilized polymer is susceptible to such degradation inasmuch as it contains monomeric units of comparatively high susceptibility to thermal degradation which are interspersed with other monomeric units which are comparatively stable to thermal degradation. The invention comprises subjecting the polymer to a treatment to degrade the end portions of the molecules of the polymer which are made up of the comparatively susceptible monomeric units thereby leaving a residual polymer having the comparatively stable monomeric units in terminal portions of its molecules. In one embodiment of this invention at least 90% of the polymeric chains of the molecules of the treated polymer have comparatively stable, or comparatively thermal-resistant, units in terminal positions. The treatment of this invention involves reacting the polymer with a reactant having a pH between about 9.5 and 11.0. This treatment produces a stabilized polymer having improved color characteristics.

Oxymethylene polymers, having recurring —$OCH_2$— units directly attached to each other, have been known for many years. They may be prepared by the polymerization of anhydrous formaldehyde or by the polymerization of trioxane, which is a cyclic trimer of formaldehyde. High molecular weight oxymethylene polymers vary in thermal stability and, in accordance with a preferred embodiment of this invention, the polymer which is stabilized is an oxymethylene polymer containing carbon-to-carbon single bonds in the main polymer chain.

In a particularly preferred embodiment of this invention the polymeric compounds to be treated are oxymethylene copolymers having at least one chain containing recurring oxymethylene units interspersed with —OR— groups in the main polymer chain, where R is a divalent radical containing at least two carbon atoms directly linked to each other and positioned in the polymer chain between the two valences, with any substituents on said R radical being inert, that is those which are free of interfering functional groups and will not induce undesirable reactions. Copolymers containing from 60 to 99.6 mol percent of recurring oxymethylene groups are suitable for treatment in accordance with this invention. Particularly suitable are those polymers having between about 85 and 99.6 mol percent of recurring oxymethylene groups and between about 0.4 and about 15 mol percent of —O—R— groups. In a preferred embodiment R may be, for example, an alkylene or substituted alkylene group containing at least two carbon atoms.

Among the copolymers which may be utilized in accordance with this aspect of the invention are those having a structure comprising recurring units having the formula

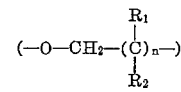

wherein $n$ is an integer from zero to 5 and wherein $n$ is zero in from 60 to 99.6 percent of the recurring units. $R_1$ and $R_2$ are inert substituents, that is, substituents which are free of interfering functional groups and will not induce undesirable reactions.

A preferred class of copolymers are those having a structure comprising oxymethylene and oxyethylene recurring units are oxymethylene units.

A preferred class of copolymers are those having a structure comprising oxymethylene and oxyethylene recurring units wherein from 60 to 99.6 percent of the recurring units are oxymethylene units.

Particularly preferred oxymethylene polymers are those having incorporated therein oxyalkylene units having adjacent carbon atoms which are derived from cyclic ethers having adjacent carbon atoms. These copolymers may be prepared by copolymerizing trioxane with a cyclic ether having the structure

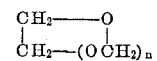

where $n$ is an integer from zero to 2.

Examples of preferred polymers include copolymers of trioxane and cyclic ethers containing at least two adjacent carbon atoms such as the copolymers disclosed in U.S. Patent No. 3,027,352, by Cheves T. Walling, Frank Brown and Kenneth W. Bartz, which patent is assigned to the same assignee as the subject application.

Among the specific cyclic ethers which may be used are ethylene oxide; 1,2-dioxolane, 1,3,5-trioxepane; 1,3-dioxane; trimethylene oxide; pentamethylene oxide; 1,2-propylene oxide; 1,2-butylene oxide; neopentyl formal; and butadiene monoxide.

As used in the specification and claims of the subject application, the term "oxymethylene" includes substituted oxymethylene, where the substituents are inert with respect to the reactions in question, that is, the substituents are free of interfering functional groups and will not introduce undesirable reactions.

As used in the specification and claims of this application, the term "copolymer" means polymers having two or more monomeric groups, including terpolymers and higher polymers. Suitable terpolymers include those disclosed in U.S. Patent application S. No. 229,715, filed Oct. 10, 1962 by W. E. Heinz and F. B. McAndrew, which is assigned to the same assignee as the subject application.

In particular the subject invention relates to a process for the stabilization of a normally solid oxymethylene copolymer having a melting point above about 150° C., the molecules of said copolymer containing from 60 to 99.6 mol percent of comparatively unstable monomeric oxymethylene units interspersed with comparatively stable monomeric —O—R— units wherein R is a divalent radical containing at least two carbon atoms directly linked to each other and positioned in the polymer chain between the two valences, with any substituents on said R radical being inert, at least part of the terminal portions of said molecules comprising said unstable monomeric units, said process comprising placing said polymer and between about 2 and about 25 weight percent of said polymer of a reactant selected from the group consisting of water, organic hydroxy-containing alcohols and mixtures thereof in a reactor, said reactant having a pH between 9.5 and 11.0, reacting said polymer with said reactant by exposing said polymer and said reactant to a temperature between about 160° C. and about 240° C. and a pressure between about 150 p.s.i.a. and about 10,000 p.s.i.a. so that said polymer and said reactant are in liquid condition, for between about 0.01 and about 15 minutes, said temperature and time being sufficient to remove said stable monomeric units from the terminal portions of said molecules so that said molecules are terminated by said table monomeric units, and removing the unreacted reactant and other volatilizable material by reducing the pressure to a pressure between about 0.1 p.s.i a. and about 50 p.s.i.a., so that said materials are volatilized The preferred polymers which are treated in this inventino are thermoplastic materials having a melting point of at least 150° C. and are normally millable at a temperature of 200° C. They have a number average molecular weight of at least 10,000. These polymers have a high thermal stability before treatment in accordance with this invention but this stability is markedly improved by such treatment. For example, if a sample of the polymer which has been treated in accordance with this invention, and which has also been chemically stabilized as described below, is placed in an open vessel in a circulating air oven at a temperature of 230° C. and its weight loss is measured without removal of the sample from the oven, it will have a thermal degradation rate of less than 1.0 wt. percent min. for the first 45 minutes and, in preferred instances, less than 0.1 wt. percent/min. for the same period of time.

The preferred polymers which are treated in this invention have an inherent viscosity of at least one (measured at 60° C. in a 0.1 weight percent solution in p-chlorophenol containing 2 weight percent of α-pinene). After treatment the preferred copolymers exhibit remarkable alkaline stability. For example, if the treated copolymers are refluxed at a temperature of about 142°–145° C. in a 50% solution of sodium hydroxide in water for a period of 45 minutes, the weight of the copolymer will be reduced by less than one percent.

The preferred catalysts used in the preparation of the desired copolymers are boron fluoride and boron fluoride coordinate complexes with organic compounds, particularly those in which oxygen or sulfur is the donor atom.

The coordinate complex of boron fluoride may, for example, be a complex with a phenol, an ether, an ester, or a dialkyl sulfide. Boron fluoride dibutyl etherate, the coordinate complex of boron fluoride with dibutyl ether, is a preferred coordinate complex. The boron fluoride complex with diethyl ether is also very effective. Other boron fluoride complexes which may be used are the complexes with methyl acetate, with ethyl acetate, with phenyl acetate, with dimethyl ether, with methyl phenyl ether and with dimethyl sulfide. Suitable catalysts are disclosed in U.S. Patents 2,989,505, 2,989,506, 2,989,507, 2,989,509 all of which are by Donald E. Hudgin and Frank M. Berardinelli; 2,989,510, by George J. Bruni; and 2,989,511 by Arthur W. Schnizer. All the above patents are assigned to the same assignee as the subject application.

The coordinate complex of boron fluoride should be present in the polymerization zone in amounts such that its boron fluoride content is between about 0.001 and about 1.0 weight percent based on the weight of the monomers in the polymerization zone. Preferably, amounts between about 0.003 and about 0.1 weight percent should be used.

The monomers in the reaction zone are preferably anhydrous or substantially anhydrous. Small amounts of moisture, such as may be present in commercial grade reactants or may be introduced by contact with atmospheric air, will not prevent polymerization, but should be removed for best yields.

In preparing the preferred copolymers, the trioxane, cyclic ether and catalyst are dissolved in a common anhydrous solvent such as cyclohexane, and permitted to react in a sealed reaction zone. The temperature in the reaction zone may vary from about 0° C. to about 120° C. The period of reaction may vary from about 5 minutes to about 72 hours. Pressures from subatmospheric to about 100 atmospheres, or more, may be used, although atmospheric pressure is preferred.

The chemical constitution of the cyclic ether must be considered. Thus, 1,3-dioxolane contains both an oxymethylene group and an oxyethylene group. Its incorporation into the copolymer molecule increases both the oxymethylene and the oxyethylene content of the polymer molecule.

In general, the cyclic ether is present in the reaction mixture in amounts between about 0.2 and about 30 mol percent, based on the total mols of monomer. The optimum proportion will depend on the particular copolymer desired, the expected degree of conversion and the chemical constitution of the cyclic ether used.

The copolymers produced from the preferred cyclic ethers have a structure substantially composed of oxymethylene and oxyethylene groups in a ratio from about 250:1 to about 1.5:1.

Upon completion of the polymerization reaction it is desirable to neutralize the activity of the polymerization catalyst since prolonged contact with the catalyst degrades the polymer. The polymerization product may be treated with an aliphatic amine, such as tri-n-butylamine or triethylamine, in stoichiometric excess over the amount of free catalyst in the reaction product, and preferably in an organic wash liquid which is a solvent for unreacted trioxane. Or, if desired, the reaction product may be washed with water which neutralizes catalyst activity. A detailed description of suitable methods of neutralizing catalyst activity may be found in U.S. Patent No. 2,989,509 by Donald E. Hudgin and Frank M. Berardinelli, assigned to the same assignee as the subject application.

In accordance with the subject invention the comparatively stable monomeric portions or units of the polymer may be removed by a process which comprises treating the polymer with a reactant under conditions such that the polymer-reactant system is in liquid form and continuing the reaction at an elevated temperature and pressure and for a period of time sufficient to remove the comparatively stable portions or units from the ends of the polymer molecules so that the molecules are terminated by comparatively stable units.

The polymer-reactant system may achieve liquid form by a number of methods, such as (1) melting the polymer and adding the reactant thereto under such conditions that the polymer-reactant system remains liquid or (2) mixing the polymer and the reactant and then heating until the polymer-reactant system is in liquid form.

When the copolymer is a heterogeneous copolymer with the comparatively unstable units being oxymethylene units, the preferred chemical treatment is a "hydrolysis" treatment under alkaline conditions where the pH of the hydrolysis reactant is between 9.5 and 11.0. In a preferred embodiment the polymer is reacted with from about 2 weight percent to about 25 weight percent of the preferred hydrolysis reactant. The reaction must take place at an elevated temperature and pressure such that the polymer-reactant system will remain in a liquid condition during the reaction. Thus the treatment may be referred to as a "molten hydrolysis" or "melt hydrolysis". In general such treatment is disclosed in U.S. patent application Ser. No. 289,389, filed June 20, 1963 by Charles M. Clarke, which application is now U.S. patent 3,318,848 issued May 9, 1967, and is assigned to the same assignee as the subject application.

The hydrolytic reactant may be water or an organic hydroxy-containing compound such as a primary, secondary or tertiary aliphatic or aromatic alcohol or mixtures thereof. Suitable alcohols include aliphatic alcohols and preferably those containing from 1 to 20 carbon atoms including methyl alcohol, ethyl alcohol, n-propyl alcohol, isopropyl alcohol, n-butyl alcohol, isobutyl alcohol, sec-butyl alcohol, tert-butyl alcohol, the amyl alcohols, the hexyl alcohols, octyl alcohols including capryl alcohol, decyl alcohol, lauryl alcohol, myristyl alcohol, cetyl alcohol, stearyl alcohol, beta-methoxyethyl alcohol, etc. Other suitabe alcohols include the aromatic alcohols, preferably those having 1 to 20 carbon atoms, including benzyl alcohol, beta-phenylethyl alcohol, o-methylbenzyl alcohol, diphenylcarbinol, triphenylcarbinol, o-ethylbenzyl alcohol, p-propylbenzyl alcohol, 2-methylolbenzyl alcohol, 3-ethylol-benzyl alcohol, 3-methylol alpha-phenylethyl alcohol, etc.

Other suitable alcohols include cycloaliphatic alcohols, preferably those having from 1 to 20 carbon atoms including cyclopentyl carbonyl dicyclohexyl-1,1'-diol, 1,2-dimethylcyclopentane-1,2-diol, cyclohexyl alcohol, 1,2-dimethylcyclopentyl alcohol, 1 - methylcyclohexyl, alcohol, 3-methylcyclohexyl alcohol, 2-propylcyclopentyl alcohol, 2,2-dimethylcyclopentyl alcohol, cyclopentylethyl methylol, cyclohexylethyl methylol, etc.

Other suitable alcohols include the polyhydric alcohols, some of which have been mentioned above, preferably those containing from 1 to 20 carbon atoms, such as ethylene glycol, glycerol, diethylene glycol, pentamethylene glycol, propylene glycol, trimethylene glycol, 1,2-butanediol, 1,3-butanediol, 1,4-butanediol, hexamethylene glycol, trimethylolpropane, trimethylolethane, quercitol, inositol, 1,8-octanediol, 1,3,7-octanetriol, etc.

As used herein the term "hydrolysis" includes the reaction of the polymer with water or the aforementioned organic hydroxy-containing materials or mixtures thereof.

The terminal units of the oxymethylene polymer are often hydroxy-substituted oxymethylene

(—O—CH$_2$—OH)

units and detachment of an oxymethylene group from the polymer molecule by the hydrolysis reaction has the effect of shifting the hydrogen atom of the hydroxyl group to the oxygen atom of the next adjacent oxymethylene group.

When oxyethylene units, for example, are incorporated in the polymer chain by copolymerization as described above, the successive detachment of oxymethylene units takes place until an oxyethylene unit becomes the terminal unit of the chain. The oxyethylene units, having carbon-to-carbon bonds therein, are comparatively resistant to such detachment, and remain attached to the polymeric chain in the terminal position and protect the internal oxymethylene units from further hydrolytic removal. Since oxyethylene units are also resistant to detachment by heat, the degraded molecule has a better initial thermal stability than the orginal copolymer from which it was derived.

It has been found that the products of the selective treatment of this invention, after substantially constant weight is achieved, are also extremely stable against attack by the reaction conditions. Therefore, in a preferred embodiment, the polymer is subjected to the reaction conditions until it achieves substantially constant weight. Thus, an oxymethylene copolymer having had the hydrolytic treatment, is not only thermally stable but is also extremely stable against such further hydrolytic treatment even at conditions more severe than those of the treatment and despite the fact that the polymer still has a substantial content of internal oxymethylene units which are normally subject to degradation by alkaline hydrolysis unless protected by suitable end groups which are resistant to degradation under such conditions.

The polymer, in liquid form, is subjected to the hydrolysis reaction under alkaline conditions such that the pH of the hydrolysis reactant, when added to the polymer, is between 9.5 and 11.0. To obtain such a pH, alkaline material must be present. The alkaline material is preferably water soluble, or soluble in the organic hydroxy-containing material, and may be a strongly basic hydroxide such as the hydroxide of an alkali metal or alkaline earth metal, or it may be the salt of a strong base and a weak acid, or it may be ammonia or an organic base such as an amine or an amidine.

Among the specific alkaline materials which may be used are sodium hydroxide, potassium hydroxide, sodium carbonate, sodium acetate, ammonium hydroxide, triethylene amine, tripropyl amine, tetramethyl guanadine, trimethylamine, triethylamine, tributylamine, melamine, calcium hydroxide, etc. The amount of alkaline material present in the chemical reaction is from 0.001 weight percent to about 10.0 weight percent, preferably between about 0.001 weight percent and about 1.0 weight percent.

One advantage of the alkaline hydrolysis over neutral hydrolysis is that the alkaline hydrolysis is faster and the alkaline material will neutralize any excess polymerization catalyst present or any acidic material formed during the reaction which might otherwise tend to degrade the polymer during the hydrolysis step.

In certain instances it is desirable to obtain the desired pH by adding an alkaline material, such as triethyamine, in an amount sufficient that triethylamine will maintain basic conditions throughout the course of the hydrolysis reaction and will react with any acidic materials formed. However, if an adequate amount of the basic material is present the pH may be higher than desired in the hydrolysis reactant. When this occurs the pH may be adjusted to the desired values by adding an acid to the triethylamine solution.

In some circumstances, a volatile acid is preferred because of the ease of removal of the acid during the melt hydrolysis process. For example, the acid may be volatilized through a vent in the low pressure section as described below. However, if a washing step is used, after the melt hydrolysis, a suitable non-volatile acid can be used, which acid is removed during the washing step. Suitable volatile acids include formic acid, acetic acid, hydrochloric acid, etc. Suitable non-volatile acids include sulfuric acid, phosphoric acid, propionic acid, butyric acid, etc. If a strong base is used a buffering material, such as sodium acetate, may be used to obtain the desired pH.

In suitable embodiments an amount of 0.25 weight percent triethylamine, based on the weight of polymer, would be sufficient. Therefore, if 5% hydrolysis reactant was added to the polymer the hydrolyzed solution could contain 5.0 weight percent triethylamine and the pH of the hydrolysis solution would be adjusted before addition to the polymer. In some instances it may be that some water is contained in the polymer in addition to that added in the hydrolysis solution.

After the polymerization reaction it may be desirable to subject the polymer to washing and drying in order to remove unreacted monomers, solvent and catalyst residues. However, in a preferred embodiment of this invention the copolymer is subjected to the melt hydrolysis treatment promptly after the completion of the polymerization reaction. In a particularly preferred embodiment of this invention, the active catalyst is neutralized by mixing the polymerization reactor product with a material which may also serve as the chemical reactant for the hydrolysis. Specifically water, or a mixture of an alcohol, such as methanol, and water, may be used in which small amounts of ammonia or an amine such as triethylamine may be present. The reactant may include unreacted materials from the polymerization reaction, such as trioxane. These materials do not ordinarily have an undesirable effect on the subsequent melt hydrolysis treatment, and may therefore be regarded as inert for this reaction.

In a preferred embodiment the reactant must be used in an amount between about 2 weight per cent and about 25 weight per cent of the polymer. The polymer reactant system is treated and maintained under conditions such that the polymer-reactant system remains in a liquid form. Thus satisfactory results may be obtained below the melting point of the polymer itself, as long as the polymer-reactant system is liquid. For example, a system containing 80 weight per cent of a trioxane-2% ethylene oxide copolymer and 20 weight per cent of a 60% water-40% methanol reactant has a melting point about 125° C., which is considerably below the melting point of the copolymer itself. However, temperatures somewhat above the melting point of the system are preferred, because the hydrolysis reaction rate increases with increase in temperature. In a preferred embodiment the polymer-reactant system is in a single phase. The melt hydrolysis reaction will normally not take place until sufficiently elevated temperatures and pressures are reached to place the polymer-reactant system in liquid form and the materials must be held at such temperature and pressure until the desired amount of unstable portions are removed from the ends of the polymer molecules.

On some occasions it may be desirable to mix the polymer with a larger amount of reactant and after the catalyst has been neutralized remove a portion of the reactant by filtering, vaporization, etc. in order to retain only between 2 and 25 weight per cent of reactant present with the polymer during the melt hydrolysis reaction.

In another embodiment it may be desirable to neutralize the catalyst and then filter, wash and dry the polymer. The polymer may then be conveniently kept until it is subjected to the melt hydrolysis treatment at a later time.

In a preferred embodiment of this invention it is also desirable to incorporate one or more chemical stabilizers into the copolymer in order to bring its thermal degradation rate even lower. The proportion of stabilizer incorporated depends upon the specific stabilizer used. A proportion between about 0.05 and 10 weight per cent (based on the weight of polymer) has been found to be suitable for most stabilizers.

One suitable stabilizer system is a combination of (1) an anti-oxidant ingredient, such as phenolic anti-oxidant, and most suitably a substituted bisphenol, and (2) an ingredient to inhibit chain scission, generally a compound of a polymer containing trivalent nitrogen atoms.

A suitable clas of substituted bisphenols are the alkylene bisphenols including compounds having from 1 to 4 carbon atoms in the alkylene group and having from zero to 2 alkyl substituents on each benzene ring, each alkyl substituent having from 1 to 4 carbon atoms. The preferred alkylene bisphenols are 2,2'-methylene bis-(4-methyl-6-tertiary butyl phenol) and 4,4'-butylidene bis-(6-tertiary butyl-3-methyl phenol). Suitable phenolic stabilizers other than alkylene bisphenols include 2,6-di-tertiary butyl-4-methyl phenol, octyl phenol and p-phenyl phenol.

Suitable scission inhibitors include carboxylic polyamides, polyurethanes, substituted polyacrylamides, polyvinyl pyrrolidone, hydrazides, compounds having 1 to 6 amide groups, proteins, compounds having tertiary amine and terminal amide groups, compounds having amidine groups, cycloaliphatic amine compounds and aliphatic acylureas. The stabilizers may be present in the melt hydrolysis step or they may be added to the hydrolyzed polymer after the melt hydrolysis step.

After the melt hydrolysis reaction has been completed and a satisfactory amount of unstable monomeric units have been removed from the polymer molecules, the remaining chemical reactant is removed from the treated polymer. Also the degradation or reaction products and, on occasion, unreacted materials, such as trioxane, should also be removed. Formaldehyde is the principal melt hydrolysis degradation product of oxymethylene polymers and it is believed to be formed by the successive detachment of the terminal oxymethylene units from the end of the polymer chain. In some instances, particularly when the polymerization reaction product is promptly melt hydrolyzed, the hydrolyzed material may include some unreacted trioxane. In accordance with a preferred embodiment of this invention the chemical reactant, the formaldehyde, the trioxane and other volatizable materials may be removed by suddenly reducing the pressure under which the materials have been maintained, which in view of the temperature, results in the volatilization of the volatile materials. The lower pressure should be between about 0.1 p.s.i.a. and 50 p.s.i.a. and is preferably accomplished by exposing the materials to atmospheric pressure or a slight vacuum (about 0.5 p.s.i.a.). Then, if desired, the stabilized polymer may be extruded and treated further. In certain instances after extrusion the extruded strands are pelletized and stored until the polymer is ready for use.

In a preferred embodiment of this invention the time during which the molten polymer is subjected to the elevated temperatures and pressures in the presence of the reactant (this time is known as residence time) falls between about 0.1 and about 15 minutes. The temperature range is preferably between about 160° C. and about 240° C. The pressure ranges preferably between about 150 p.s.i.a. and about 10,000 p.s.i.a. The residence time, temperature and pressure are interrelated and are preferably maintained so that the polymer-reactant system remains in the liquid state and the reaction proceeds sufficiently so that the desired amount of unstable units are removed from the ends of the polymer molecules so that they are terminated by comparatively stable units.

Unless stated otherwise, the following examples used a trioxane-ethylene oxide copolymer containing about 2 weight per cent of oxyethylene groups distributed in the oxymethylene chains. Also the melt hydrolysis step of the examples took place in an extrusion device.

As indicated below, particularly in Table I, if the pH is below 9.5 or above 11.0 the color characteristics of the stabilized polymer formed, while adequate for certain purposes, are not optimum and are not as good as those obtained when the pH is between 9.5 and 11. This fact is shown when the materials are tested on a test described as the "MX Color" test. This test is described as follows:

The stabilized copolymers were placed in the bore of an extrusion Plastometer (described in ASTM-D-1238-57T), and were confined in the bore for 30 minutes at a temperature of 230° C. This material was then discharged and compression molded (at 190° C.) one minute without application of pressure, and 4 minutes (at 6500 p.s.i.g.) into an 11 gram disc having a 2½" diameter. These compression molded discs were color measured with Hunterlab D-25 Color Meter, and the results are shown in Table I after the designation "MX Color."

The Hunterlab Color Meter test yields a readout on three scales, L, $a$ and $b$. The L scale is a measure of lightness and varies from 100 for perfect white to zero for black; $a$ measures redness when plus, gray when zero, greenness when minus, and $b$ measures yellowness when plus, gray when zero, blueness when minus. Thus, visually, a tan to brown discoloration observed after the foregoing test is characterized by increased positive $a$ values, increased high positive $b$ values, and decreased L values.

In the following examples the reaction product from the polymerization reactor was washed with water and then with acetone and dried to neutralize and remove the catalyst and to remove unreacted trioxane.

In these examples a two stage extrusion process was used.

The polymer was force fed to a one inch single screw extruder having a length to diameter ratio of 20/1. The feed section of the extruder had five turns and a channel depth of 185 mils. Thus the polymer is fed under pressure to the metering or melt hydrolysis section which has 6 turns with a channel depth of 60 mils. The reactant is pumped into the extruder at the beginning of the melt hydrolysis section. Next there is a restricted section of one and one-half turns with a channel depth of 22 mils. This restricted section maintains sufficient pressure in the melt hydrolysis section. The polymer-reactant system then passes to a vented section (which may be referred to as a low pressure section) having four turns with a channel depth of 220 mils. When the heated, pressurized polymer-reactant system passes to the vented section, the pressure is suddenly reduced and the formaldehyde, reactant, and other vaporizable components are vaporized and removed through the vent. The treated polymer then passes through a pumping (or pre-extrusion) section having 3½ turns with a channel depth of 60 mils, where the polymer is densified. The polymer is subsequently extruded through a die. The chemical stabilizers are then blended with the polymer and re-extruded. Thus the polymer is melt hydrolyzed in a simple two-stage extrusion operation. A one-stage extrusion operation can be used by preblending the chemical stabilizers before melt hydrolysis in the extruder, or, by adding the chemical stabilizers to the melted polymer in the extruder after the formaldehyde and reactants have been removed in the vent.

TABLE I

| Example | 1 | 2 | 3 | 4 | 5 |
|---|---|---|---|---|---|
| Hydrolysis Solution pH | 9.0 | 9.5 | 10.0 | 10.5 | 12 |
| Triethylamine Concentration, wt. percent | 2.5 | 2.5 | 2.5 | 2.5 | 5.8 |
| MX Color: | | | | | |
| L | 46.8 | 70.7 | 73.8 | 67.9 | 63.7 |
| a | 8.2 | 2.1 | 1.5 | 2.6 | 6.0 |
| b | 22.1 | 23.6 | 22.0 | 23.1 | 26.1 |

In these examples the following stabilizers were used (weights based on the weight of polymer): 0.03 weight percent melamine, 0.1 weight percent cyanoguanidine and 0.5 weight percent 2,2'-methylene bis-(4-methyl-6-tertiary butyl phenol).

As can be seen in Table I, the MX Color is at its best when the pH is 10.0 but is still adequate between 9.5 and 10.5. In other tests it has been shown to be adequate up to 11.0.

It is to be understood that the foregoing detailed description is given merely by way of illustration and that many variations may be made therein without departing from the spirit of my invention.

The embodiments of the invention in which an exclusive property or privilege is claimed are defined as follows:

1. In an improved process for the stabilization of a normally solid oxymethylene copolymer having a melting point above about 150° C., the molecules of said copolymer containing from 60 to 99.6 mol percent of comparatively unstable monomeric oxymethylene units interspersed with comparatively stable monomeric —OR— units wherein R is a divalent radical containing at least two carbon atoms directly linked to each other and positioned in the polymer chain between the two valences, with any substituents on said R radical being inert, at least part of the terminal portions of said molecules comprising said unstable monomeric units, which comprises:
   (a) introducing into a reaction zone said copolymer and from about 2 to about 25 weight percent, based on the copolymer, of a reactant selected from the group consisting of water, organic hydroxy-containing alcohols and mixtures thereof;
   (b) forming a melt consisting essentially of the copolymer and reactant in said zone by maintaining the reaction zone at a temperature in the range of from about 160° to 240° C., and at a pressure in the range of from about 150 to 10,000 p.s.i.a.;
   (c) reacting the molten copolymer with the reactant under the above conditions of temperature and pressure for a period of time in the range of from about 0.1 to about 15 minutes to remove unstable monomeric oxymethylene units from the terminal portion of the copolymer molecules so that at least 90% of the resulting polymeric chains of the molecules are terminated by the stable monomeric units; and
   (d) removing the unreacted reactant and other volatilizable material by reducing the pressure to a pressure between about 0.1 to about 50 p.s.i.a. to volatilize the unreacted reactant, the improvement which comprises:
   reacting said polymer with said reactant at a pH between 9.5 and 11.0.

2. The process of claim 1 wherein said stable units are oxyethylene units.

References Cited
UNITED STATES PATENTS

| 3,174,948 | 3/1965 | Wall et al. | 260—67 |
| 3,219,623 | 11/1965 | Berardinelli | 260—45.95 |
| 3,301,821 | 1/1967 | Asmus et al. | 260—67 |
| 3,275,593 | 9/1966 | Querfurth | 260—45.9 |

WILLIAM H. SHORT, *Primary Examiner.*

L. M. PHYNES, *Assistant Examiner.*

U.S. Cl. X.R.

260—45.95